(12) United States Patent
Nada et al.

(10) Patent No.: US 9,412,003 B2
(45) Date of Patent: Aug. 9, 2016

(54) DISCRIMINANT FUNCTION SPECIFYING DEVICE, DISCRIMINANT FUNCTION SPECIFYING METHOD, AND BIOMETRIC IDENTIFICATION DEVICE

(71) Applicant: FUJITSU LIMITED, Kawasaki-shi, Kanagawa (JP)

(72) Inventors: Hajime Nada, Kawasaki (JP); Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/638,301

(22) Filed: Mar. 4, 2015

(65) Prior Publication Data

US 2015/0254496 A1    Sep. 10, 2015

(30) Foreign Application Priority Data

Mar. 10, 2014  (JP) ................................ 2014-046924

(51) Int. Cl.
G06K 9/00 (2006.01)
G06N 99/00 (2010.01)

(52) U.S. Cl.
CPC .......... *G06K 9/00067* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 7,499,591 B2* | 3/2009 | Simske | ............. | G06F 17/30705 382/159 |
| 8,526,582 B1* | 9/2013 | Kirchhoff | ......... | H04M 3/53333 379/88.14 |
| 8,966,277 B2* | 2/2015 | Rane | ....................... | G06F 21/32 380/28 |
| 2006/0078177 A1 | 4/2006 | Niinuma et al. | | |

FOREIGN PATENT DOCUMENTS

JP       2006-107340       4/2006

OTHER PUBLICATIONS

Zhou et al., "Face verification using Gavor wavelets and AdaBoost", ICPR 2006.*
Osuna et al., "Training support vector machines: an application to face detection", CVPR 1997.*
Park et al., "Iris recognition based on score level fusion by using svm", Pattern Recognition Letters 28 2007.*

* cited by examiner

*Primary Examiner* — Soo Park
(74) *Attorney, Agent, or Firm* — Staas & Halsey LLP

(57) ABSTRACT

A discriminant function specifying device includes a setting part for calculating a discriminant function by machine learning using a learning input parameter, the discriminant function being for separating a distribution of a genuine similarity from a distribution of impostor similarity, the learning input parameter being set before executing the machine learning, and for setting a plurality of discriminant functions, each of the plurality of discriminant functions being obtained by changing values of the learning input parameter and a learning output parameter, the learning output parameter being a parameter of the calculated discriminant function; a calculation part for calculating an error rate for each of the plurality of discriminant functions set by the setting part; and an extraction part for extracting one discriminant function among the plurality of discriminant functions, the one discriminant function having the error rate calculated by the calculation part which meets a predetermined error condition.

10 Claims, 7 Drawing Sheets

| CLASS | IDENTIFICATION NUMBER OF REGISTERED DATA | IDENTIFICATION NUMBER OF MATCHING DATA | FEATURE QUANTITY SCORE | | | |
|---|---|---|---|---|---|---|
| | | | SCORE A | SCORE B | ... | SCORE N |
| GENUINE MATCHING | aaaaaa_1 | aaaaaa_2 | 1.00 | 10 | ... | 1 |
| GENUINE MATCHING | bbbbbb_1 | bbbbbb_2 | 1.00 | 11 | ... | 1.5 |
| ⋮ | | | | | | |
| IMPOSTOR MATCHING | aaaaaa_1 | mmmmm_2 | 11.00 | 25 | ... | 12 |
| IMPOSTOR MATCHING | bbbbbb_1 | mmmmm_2 | 12.50 | 20 | ... | 50 |

FIG. 2

| CLASS | IDENTIFICATION NUMBER OF REGISTERED DATA | IDENTIFICATION NUMBER OF MATCHING DATA | FEATURE QUANTITY SCORE ||||
|---|---|---|---|---|---|---|
| | | | SCORE A | SCORE B | ... | SCORE N |
| GENUINE MATCHING | aaaaaa_1 | aaaaaa_2 | 1.00 | 10 | ... | 1 |
| GENUINE MATCHING | bbbbbb_1 | bbbbbb_2 | 1.00 | 11 | ... | 1.5 |
| ... | | | | | | |
| IMPOSTOR MATCHING | aaaaaa_1 | mmmmm_2 | 11.00 | 25 | ... | 12 |
| IMPOSTOR MATCHING | bbbbbb_1 | mmmmm_2 | 12.50 | 20 | ... | 50 |

30

DISCRIMINANT FUNCTION SPECIFYING DEVICE, DISCRIMINANT FUNCTION SPECIFYING METHOD, AND BIOMETRIC IDENTIFICATION DEVICE

CROSS-REFERENCE TO RELATED APPLICATION

This application is based upon and claims the benefit of priority of the prior Japanese Patent Application No. 2014-046924 filed on Mar. 10, 2014, the entire contents of which are incorporated herein by reference.

FIELD

The embodiments discussed herein are related to a discriminant function specifying device, a discriminant function specifying program, a discriminant function specifying method, and a biometric identification device.

BACKGROUND

There has conventionally been a biometric identification technique which performs authentication by using human biometric information. In such a biometric identification technique, indices indicating authentication accuracies include a false rejection rate (FRR) and a false acceptance rate (FAR). The FRR is a probability that a person is incorrectly determined as another person, which is referred to as a person rejection rate. The FAR is a probability that another person is incorrectly accepted as a person, which is referred to as an other person acceptance rate.

It is preferable in the biometric identification technique that an FRR and an FAR be as smaller as possible. For this reason, there is such a technique including: extracting multiple feature quantities from one or more pieces of biometric information; and performing authentication by using the multiple feature quantities. For example, the multiple feature quantities include feature quantities which are used by matching of the feature point method and feature quantities which are used for matching of the pattern matching method from one piece of biometric information such as a fingerprint image of one finger.

A related technology is disclosed in Japanese Laid-open Patent Publication No. 2006-107340.

As a method which is used for authenticating multiple feature quantities, there is an approach called as a score level fusion, for example. In the score level fusion, feature quantities in registered data and matched data are matched for each of kinds of the feature quantities and the obtained multiple scores are fused, so that a final authentication result is obtained. As an example of the score level fusion, a discriminant function is obtained by machine learning such as a support vector machine (SVM) by using learning data including score distribution of each of the feature quantities which are classified into a person and another person in advance. For example, a distribution bias is caused in a genuine similarity when feature quantities extracted from biometric information of an identical person are compared with each other and impostor similarity when feature quantities extracted from biometric information of a different person are compared with each other. For this reason, a discriminant function which separates the distribution of the genuine similarity from the distribution of the impostor similarity is obtained by the machine learning. For example, in the SVM, a discriminant function is obtained that maximizes a margin of the distribution of the genuine similarity and the distribution of the impostor similarity.

SUMMARY

According to an aspect of the invention, a discriminant function specifying device includes a setting part configured to calculate a discriminant function by machine learning using a learning input parameter, the discriminant function being for separating a distribution of a genuine similarity from a distribution of impostor similarity, the learning input parameter being set before executing the machine learning, and to set a plurality of discriminant functions, each of the plurality of discriminant functions being obtained by changing values of the learning input parameter and a learning output parameter, the learning output parameter being a parameter of the calculated discriminant function; a calculation part configured to calculate an error rate for each of the plurality of discriminant functions set by the setting part; and an extraction part configured to extract one discriminant function among the plurality of discriminant functions, the one discriminant function having the error rate calculated by the calculation part which meets a predetermined error condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an illustration of an example data configuration of adjustment dataset;

DESCRIPTION OF EMBODIMENTS

In the conventional machine learning, there is a case where accuracy suitable for biometric authentication is not obtained. In the biometric authentication, levels of the FRR and FAR which are desired vary according to their usage. However, in the conventional machine learning, such a discriminant function that a margin of the distribution of the genuine similarity and the distribution of the impostor similarity becomes the maximum, for example, is set. Accordingly, there is a case where accuracy according to the usage of the biometric authentication is not obtained.

Accordingly, it is desired that a discriminant function specifying device, a discriminant function specifying program, a discriminant function specifying method, and a biometric identification device which are able to obtain accuracy according to the usage of the biometric authentication.

Hereinafter, described in detail are embodiments of a discriminant function specifying device, a discriminant function specifying program, a discriminant function specifying method, and a biometric identification device. It is to be noted that the embodiments are not intended to limit this disclosure. The embodiments may be properly combined within a scope without any inconsistency.

First Embodiment

[Configuration of Discriminant Function Specifying Device]

Figure 1:
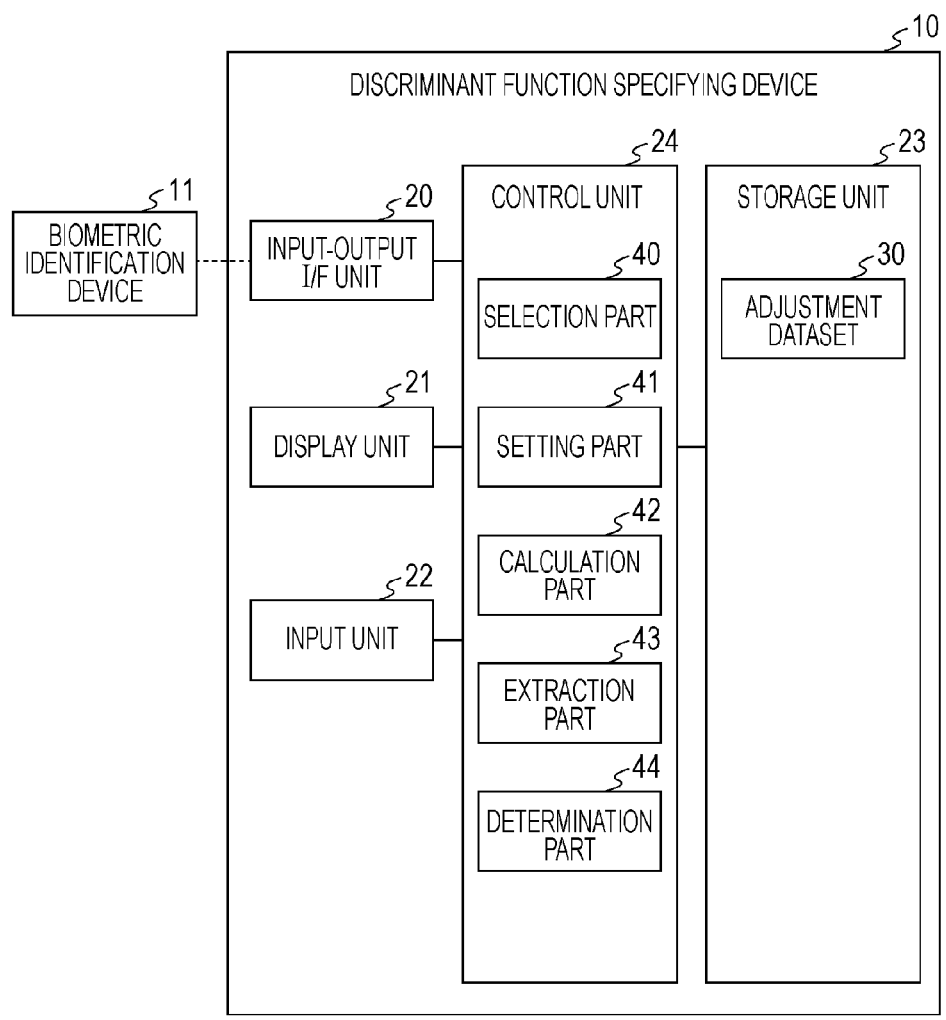
FIG. 1 illustrates an example functional configuration of a discriminant function specifying device.

A discriminant function specifying device 10 according to the present embodiment is described. FIG. 1 is a diagram illustrating an example functional configuration of a discriminant function specifying device. The discriminant function specifying device 10 is a device to specify a discriminant function which is used when a biometric identification device 11 performs biometric identification. For example, the discriminant function specifying device 10 is a device to set a discriminant function in the biometric identification device 11 when the biometric identification device 11 is shipped. The biometric identification device 11 extracts multiple feature quantities from at least one piece of biometric information and perform biometric identification based on the multiple feature quantities using a discriminant function. Described in the embodiment is an example in which the discriminant function specifying device 10 specifies a discriminant function so that FRR would be minimum or minimal when FAR is used as a reference. It is to be noted that the configuration similar to that of the embodiment may be achieved in a case where a discriminant function is specified so that FAR would be minimum or minimal when FRR is used as a reference.

As illustrated in FIG. 1, the discriminant function specifying device 10 includes an input output interface (I/F) unit 20, a display unit 21, an input unit 22, a storage unit 23, and a control unit 24. It is to be noted that the discriminant function specifying device 10 may include other units than the above units. For example, the discriminant function specifying device 10 may include various kinds of sensor units, which acquire biometric information.

The input output I/F unit 20 is an interface configured to perform input and output of various data. For example, the input output I/F unit 20 may be a communication interface configured to perform communication control or may be an input output port such as a Universal Serial Bus (USB). The input output I/F unit 20 transmits and receives various pieces of information to and from the other devices. For example, the discriminant function specifying device 10 sets a discriminant function in the biometric identification device 11 though the input output I/F unit 20.

The display unit 21 is a device configured to display various pieces of information. The display unit 21 includes display devices such as a liquid crystal display (LCD) or a cathode ray tube (CRT). It is to be noted that the display unit 21 may be a projection device such as a projector, which displays an image by projection. The display unit 21 displays various pieces of information. For example, the display unit 21 displays an operation screen to accept an operation.

The input unit 22 is an input device configured to input various pieces of information. For example, the input unit 22 includes an input device such as a mouse or a keyboard. The input unit 22 accepts an operation input from a user and inputs operation information indicating the accepted operation contents to the control unit 24. For example, the input unit 22 accepts an instruction to specify the discriminant function.

The storage unit 23 is a semiconductor memory element such as a flash memory or a storage device such as a hard disk or an optical disk. It is to be noted that the storage unit 23 may be a data rewritable semiconductor memory such as a random access memory (RAM) or a flash memory.

The storage unit 23 stores an operation system (OS) which is executed in the control unit 24 and various kinds of programs. Furthermore, the storage unit 23 stores various kinds of data used by a program which is executed in the control unit 24. For example, the storage unit 23 stores an adjustment dataset 30.

In the embodiment, the adjustment dataset 30 which is used to specify a discriminant function is prepared in advance. The adjustment dataset 30 includes multiple scores which are obtained as a result of matching feature quantities used for biometric identification. For example, the adjustment dataset 30 is created by the following procedure. First, biometric information is collected from multiple collaborators. The biometric information collected from the collaborators may be one kind or multiple kinds. Also, the same kind of biometric information is collected from the collaborators for multiple times. Then, multiple feature quantities are extracted from one or more pieces of the collected biometric information. For example, as for the extraction of the multiple feature quantities, there is a method of extracting multiple feature quantities such as a feature quantity which is used by matching of a feature point method and a feature quantity which is used by matching of a pattern matching method from one kind of biometric information such as a fingerprint of one finger. In other words, the multiple feature quantities may be extracted from one piece of the biometric information. Also, the multiple feature quantities may be respectively extracted from multiple pieces of the biometric information. For example, multiple feature quantities such as a fingerprint pattern and a vein pattern may be extracted from a finger print image and a palm vein image, respectively.

After the collection of the biometric information is completed, an genuine score is calculated by matching feature quantities extracted from different pieces of the biometric information of one collaborator. Also, an impostor score is calculated by matching feature scores extracted from different pieces of the biometric information from different collaborators. For example, every time biometric information is collected from collaborators, an individual identification number is set to multiple feature quantities extracted from the biometric information. Then, the genuine and impostor scores are calculated by matching the feature quantities for every same kind of feature quantities. The calculated genuine and impostor scores are stored as an adjustment dataset 30.

FIG. 2 is an illustration of an example data configuration of an adjustment dataset. As illustrated in FIG. 2, the adjustment dataset 30 may employ a table in which items such as a class, identification number of registered data, identification number of matching data, and feature quantity score are associated with one another. The item of the classes is an area which stores information indicating a class of matching the genuine feature quantities or a class of matching impostor feature quantities. The "genuine matching" indicates matching of genuine feature quantities. The "impostor matching" indicates matching of impostor feature quantities. The item of the identification number of registered data is an area which stores identification numbers, each of which is for multiple feature quantities to be matching sources. The item of the identification number of matching data is an area which stores identification numbers, each of which is for multiple feature quantities matched with the matching sources. The item of the feature quantity score is an area which stores scores matching the feature quantity for every same kind of feature quantities. In the present embodiment, in the item of the feature quantity score, scores are stored by being divided to a score A, score B, . . . , and score N for each kind of feature quantity. The score A, score B, . . . , and score N respectively store result scores of matching the feature scores for each of the types thereof. For example, the score A is a score matching the feature quantity of a fingerprint pattern. Also, the score N is a score matching the feature quantity of a palm veins pattern.

In the example of FIG. 2, the identification number is set by combining a number indicating a collaborator with a number indicating how many times collected. For example, the identification number "aaaaaa_1" indicates that a feature quantity is created from biometric information collected from a collaborator "aaaaaa" for the "first" time.

In the example of FIG. 2, the identification number of registered data "aaaaaa_1" and the identification number of matching data "aaaaaa_2" indicate matching of the genuine feature quantities. Also, the scores for each of the matched feature quantities indicate that the score A is "1.00", the score B "10", . . . , and the score N is "1". Also, the identification number of registered data "aaaaaa_1" and the identification number of matching data "mmmmm_2" indicate the matching of impostor feature quantities. In addition, the scores for each of the matched feature quantities indicate that the score A is "11.00", the score B is "25", . . . , and the score N is "12".

Returning to FIG. 1, the control unit 24 is a device configured to control the discriminant function specifying device 10. The control unit 24 may employ an electronic circuit such as a central processing unit (CPU) or a micro processing unit (MPU), or an integrated circuit such as an application specific integrated circuit (ASIC) or a field programmable gate array (FPGA). The control unit 24 includes an internal memory to store programs and control data, which define various kinds of processing procedures, and executes various kinds of processing by them. The control unit 24 is operated by various kinds of the programs to function as various kinds of processing units. For example, the control unit 24 includes a selection part 40, a setting part 41, a calculation part 42, an extraction part 43, and a determination part 44.

The selection part 40 performs various kinds of selections. For example, the selection part 40 performs selection from the adjustment dataset 30 based on a predetermined or certain selecting rule and creates a second adjustment dataset and first test data. For example, the selection part 40 selects the second adjustment dataset from the adjustment dataset 30 and uses the portion of the adjustment dataset 30 which is not selected yet as the first test data. For example, the predetermined rule may be such a method that some numerical value is used as a seed value, and a random value is calculated by a specific operation such as a random number generation function based on the seed value, and then, selection is randomly performed to set the second adjustment dataset from the adjustment dataset 30 based on the calculated random number. Also, the predetermined selection rule may be a selection method which has a regularity to select the adjustment dataset 30 every fixed number thereof. When the selection part 40 uses a random number, the same seed value is used to be capable of repeating the selection of the second adjustment dataset. Also, when the second adjustment dataset is selected based on the selection rule with the regularity, the selection rule is repeated to repeat the selection of the second adjustment dataset. Accordingly, further validation or additional test of data survey becomes possible for the second adjustment data set which is used for learning, so that the efficiencies of reviews on development and setting other parameters may be improved. The first test data is used for validation of authentication accuracy of an optimum discriminant function which is calculated finally. To validate the authentication accuracy which is guaranteed by the biometric identification device 11, it is preferable that the number of pieces of the first test data be more than the number of pieces of authentication accuracy validatable data. The selection part 40 may use the rest of the data as the second adjustment dataset after selecting the number of the authentication accuracy validatable data from the adjustment dataset 30.

The selection part 40 performs selection from the second adjustment dataset based on the predetermined selection rule and creates learning data and second test data. The predetermined selection rule uses a same method as the case where the second adjustment dataset and the first test data are selected. It is to be noted that the selection rule may use a different method from the case where the second adjustment dataset and the first test data are selected.

In the discriminant function specifying device 10 according to the embodiment, selection of the second adjustment dataset is performed for multiple times and specifies a discriminant function which is used for biometric identification by performing machine learning by using each of the second adjustment datasets. Accordingly, the discriminant function specifying device 10 may suppress to obtain a discriminant function which is optimized in a specific state because the selected second adjustment dataset is disproportionally emphasized on the data in the specific state.

The machine learning applicable to the present embodiment includes SVM or discriminant analysis, for example. It is preferable as a Kernel which is used for this SVM to use a Kernel which is realized by holding only a predetermined number of coefficients without being affected by the number of support vectors obtained as a result of learning. For example, a linear Kernel and a polynomial Kernel are included. It is assumed in the present embodiment that the discriminant function expressed by Equation (1) using a polynomial Kernel is used. In the case of Equation (1), when a degree of the discriminant function is determined, the number of coefficients $\beta$ of the discriminant function is determined. The discriminant function may be realized only by holding the number of coefficients $\beta$. It is assumed in the embodiment that a coefficient $\beta$ is used as a learning output parameter which is a parameter for the discriminant function calculated by the learning.

$$F(x) = \sum_{i \in S} \alpha_i K(x, v_i) = \sum_{i \in S} \alpha_i (x^T v_i + 1)^p = \sum_{i \in S} \alpha_i (x_1 v_{i1} + \ldots + x_n v_{in} + 1)^p = \sum_{0 < p_1 + \ldots + p_n < p} \beta(p_1, \ldots, p_n) x_1^{p_1} x_2^{p_2} \ldots x_n^{p_n} \quad (1)$$

It is assumed here that the expressions used in Equation (1) are as follows.

n: The number of feature quantities.
$x=(x_1, x_2, \ldots, x_n)$: The list of scores of feature quantities.
S: Set of indices of support vectors
$v_i=(v_1, v_2, \ldots, v_n)$ (i$\in$S)S: Support vector
$\alpha_i$: Coefficients of support vectors
$K(x, v_i)=(x^T v_i+1)^p$: Kernel (polynomial Kernel)
p: Degree of discriminant function (learning input parameter)
$\beta(p_1, p_2, \ldots, p_n)$: Coefficient of discriminant function (learning output parameter)

It is preferable that a degree of the polynomial Kernel or the like be changed to an optimum value for each piece of data dealt by the machine learning. Hereinafter, a numerical value which is changed to an optimum value for each piece of such data is expressed as a learning input parameter. Another example of the learning input parameter includes a margin parameter which determines a margin maximization and an FRR or FAR minimization tradeoff in a soft margin SVM.

In the conventional machine learning, an authentication accuracy which is calculated by the machine learning is used to determine an optimum learning input parameter. For example, in the SVM, a learning input parameter is set so that margins of distributions of scores which are obtained by matching genuine feature quantities and scores which are obtained by matching impostor feature quantities would be maximum.

On the other hand, the biometric identification device 11 has different authentication accuracy of biometric authentication which is desired depending on an intended usage. When it is assumed that the biometric identification device 11 is, for example, an automated teller machine (ATM), an office personal computer (PC), a room entering and leaving management device, or the like, the biometric identification device 11 has to have high security because another person is not allowed to be accepted. On the other hand, when it is assumed that the biometric identification device 11 is a device such as a smartphone or a mobile telephone, which identifies a user with a high frequently, the biometric identification device 11 has to have setting which provides high user friendliness without generating a case where a user is rejected so often. When a learning input parameter is set using the conventional machine learning method without modification, accuracy according to the intended usage of the biometric identification is not secured in some cases.

For this reason, in the discriminant function specifying device 10 according to the embodiment, an optimum learning input parameter which is suitable for an environment of the biometric identification device 11 is set. For example, in a case where another person is not allowed to be accepted and a high security is desired, an optimum learning input parameter is a learning input parameter in which an FRR becomes minimum or minimal based on the FAR desired for the biometric identification device 11. On the other hand, in a case of the setting with high user friendliness without generating a case where a user is rejected so often, an optimum learning input parameter is a learning input parameter in which an FAR becomes minimum or minimal based on the FRR desired for the biometric identification device 11. In the present embodiment, the description is given of a case where a learning input parameter is set as an optimum learning input parameter, where calculation with the learning input parameter will give a discriminant function close to a discriminant function of which the FRR becomes minimum or minimal when a predetermined FAR is used as a standard. Described hereinafter in detail is a method in which the discriminant function specifying device 10 according to the embodiment obtains an optimum learning input parameter.

The setting part 41 is a processing part to perform various kinds of settings. For example, the setting part 41 sets multiple provisional discriminant functions by performing learning by machine learning using multiple candidates for the learning input parameter and learning data. For example, the setting part 41 sets multiple provisional discriminant functions by changing a degree of the discriminant function expressed by the above Equation (1) in a predetermined range and sets multiple provisional discriminant functions by performing the learning by the machine learning using the learning data.

The calculation part 42 is a processing part to perform various kinds of calculations. For example, the calculation part 42 calculates provisional authentication accuracies by using the second adjustment dataset for each of the multiple provisional discriminant functions. For example, the calculation part 42 calculates an FAR and FRR as a provisional authentication accuracy for each provisional discriminant function. In the present embodiment, the provisional accuracy is a minimum value of the FRR when a threshold achieving a predetermined FAR is used.

The setting part 41 selects a provisional authentication accuracy having a minimum value among the multiple provisional authentication accuracies calculated by the calculation part 42, and determines a candidate for a learning input parameter corresponding to the provisional discriminant function having calculated the provisional authentication accuracy as an optimum learning input parameter. For example, the setting part 41 obtains, from the multiple provisional discriminant functions, a learning input parameter in which an FAR meets a predetermined standard and an FRR becomes minimum or minimal. The setting part 41 fixes only a degree as the learning input parameter. The machine learning is performed again for obtaining the coefficient(s) by processing to be described later. Accordingly, the degree is determined as a learning input parameter. When the learning input parameters corresponding to the minimum value are calculated, the setting part 41 determines an average value or intermediate value of the learning input parameters corresponding to the minimum value as an optimum learning input parameter.

Alternatively, the setting part 41 may determine an optimum learning input parameter of each provisional discriminant function from the multiple learning input parameters by equally dividing the learning data to perform cross-validation.

Figure 3:
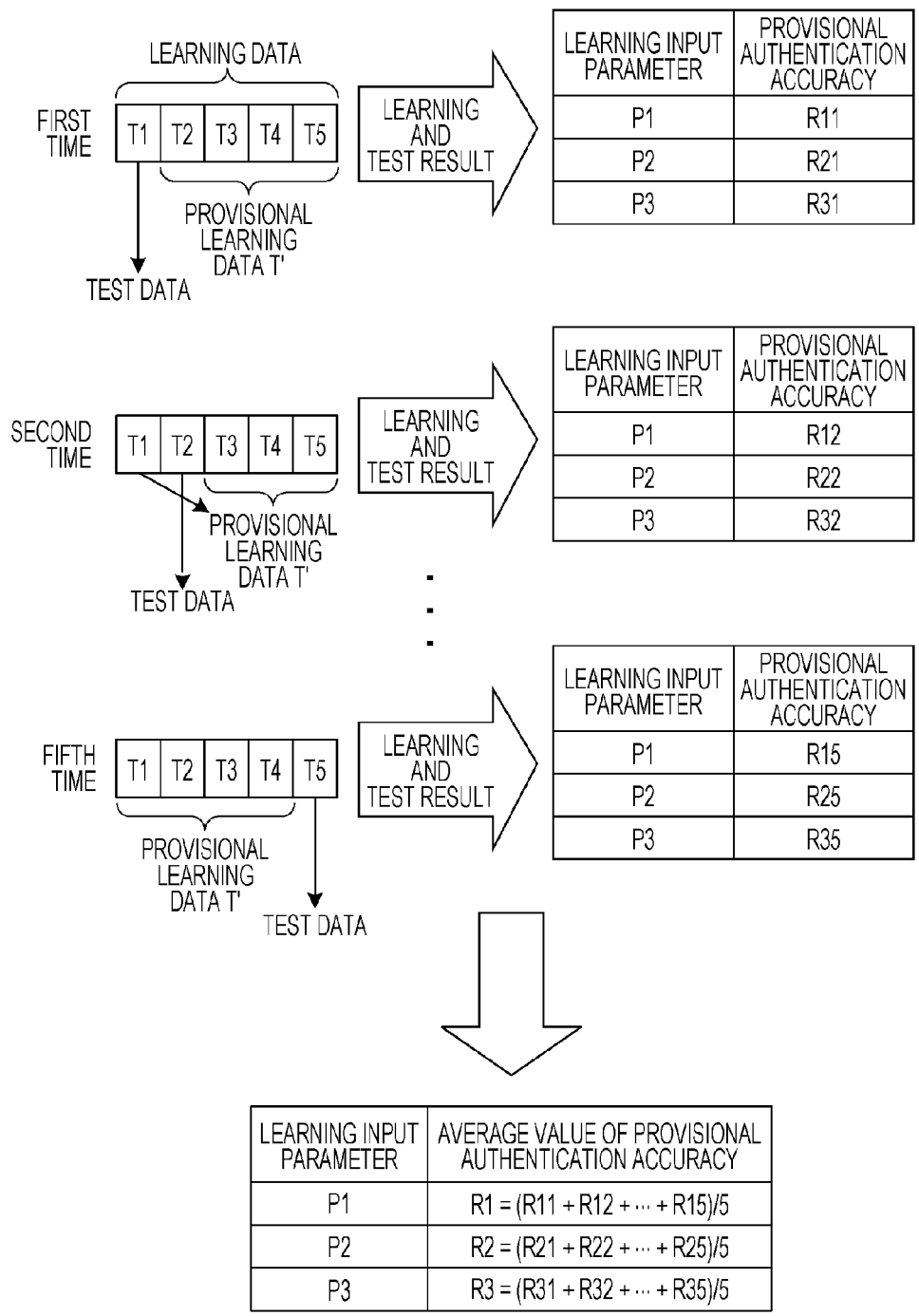
FIG. 3 is an illustration of an example flow of a cross-validation.

FIG. 3 is an illustration of an example flow of the cross-validation. The setting part 41 equally divides learning data. In the example of FIG. 3, the learning data is divided into five pieces of learning data T1 to T5. The setting part 41 selects any one piece of the learning data T1 to T5 for an accuracy test and the rest of the data is set as provisional learning data T'. The setting part 41 uses the provisional learning data T' and each learning input parameter and performs machine learning to obtain a provisional discriminant function. Also, the setting part 41 uses the data for accuracy test to calculate a provisional authentication accuracy of each provisional discriminant function. The setting part 41 repeatedly calculates a provisional discriminant function and a provisional authentication accuracy by changing the data for accuracy test. In other words, in the cross-validation, every time a value of each learning input parameter of the provisional discriminant function is changed, a provisional authentication accuracy of the provisional discriminant function is repeatedly calculated by changing the provisional learning data T' and the data for accuracy test. In the example of FIG. 3, a provisional authentication accuracy of the provisional discriminant function is calculated for five times by sequentially changing the data for accuracy test in the order of the learning data T1 to T5 with respect to the learning input parameters P1 to P3. For example, in the example of FIG. 3, as for the case where it is assumed that the learning data T1 is set as the data for accuracy test, such calculations are made that the provisional authentication accuracy of the learning input parameter P1 is R11, the provisional authentication accuracy of the learning input parameter P2 is R21, and the provisional authentication accuracy of the learning input parameter P3 is R31. The setting part 41 calculates an average value of the provisional authentication accuracies for each learning input parameter of the discriminant function. In the example of FIG. 3, average values R1 to R3 of provisional authentication accuracies are calculated with respect to the learning input parameters P1 to P3 of the discriminant function. For example, as for the learning input parameter P1, the average value of the provisional authentication accuracies is calculated by R1=(R11+ R12+ . . . +R15)/5. The setting part 41 sets the learning input parameter whose average value of the provisional authentication accuracies is the best as an optimum learning input parameter. For example, in the example of FIG. 3, when the average value R1 is the best among the average values R1 to R3 of the provisional authentication accuracies, a value for the learning input parameter P1 of the average value R1 is set as the optimum learning input parameter.

In addition, when a number of learning input parameters corresponding to the minimum value is calculated for multiple times, the setting part 41 may set an average value or intermediate value of the learning input parameters corresponding to the minimum value as an optimum learning input parameter. Also, the setting part 41 may use a value around the optimum learning input parameter as a candidate for a new learning input parameter and performs a cross-validation again so as to reset an optimum learning input parameter. In this case, it is preferable that the setting part 41 set a range of the learning input parameter for the first time to be wider and set a range of a candidate for a learning input parameter on and after the second time to be narrower than the previous range so as to perform searching in detail. Performing such searching may increase a probability that the setting part 41 becomes capable of specifying a learning input parameter in which the provisional authentication accuracy becomes not minimal but minimum.

The setting part 41 performs the learning by using the optimum learning input parameter and the learning data to specify a second provisional discriminant function.

The selection part 40, the setting part 41, and the calculation part 42 specify a second provisional discriminant function and calculate an authentication accuracy of the second provisional discriminant function for a predetermined number of times while changing the learning data and the second test data.

The calculation part 42 uses the respective second adjustment datasets for the predetermined number of the calculated second provisional discriminant functions to calculate a second provisional authentication accuracy for each of the second provisional discriminant functions. For example, the calculation part 42 calculates an FAR and FRR as a second provisional authentication accuracy of the second provisional discriminant function.

The extraction part 43 is a processing part to perform various kinds of extractions. For example, the extraction part 43 extracts, among the multiple second provisional authentication functions, a second provisional discriminant function of which an FAR meets a predetermined standard and an FRR becomes minimum or minimal. The extraction part 43 uses the extracted second provisional discriminant function as a provisional optimum discriminant function. It is to be noted that when a number of second provisional discriminant functions in each of which an FAR meets a predetermined standard and an FRR becomes minimum or minimal are extracted, the extraction part 43 sets a function having an average value or an intermediate value of coefficients of the extracted second provisional discriminant functions as a coefficient of a provisional optimum discriminant function. In the present embodiment, since a second provisional discriminant function is created by using the learning data selected among the data of the second adjustment dataset, data having the same score with the previous learning data is sometimes included even when the learning data is reselected. For this reason, the coefficient of the second provisional discriminant function has a tendency of not being greatly changed. When there are multiple second provisional identification functions meeting the condition, it is often the case where the average value or intermediate value of the coefficients has a small difference with the coefficients of almost all second provisional discriminant functions and accuracy is stable, it may be adopted as the coefficient of the provisional optimum discriminant function. Furthermore, the average value or intermediate value of the coefficients is used, so that a preferable range of a coefficient value may be searched without searching an outlier when the coefficient is changed in a predetermined range by the following processing.

The setting part 41 sets a third provisional discriminant function for multiple times, in which the coefficient of the provisional optimum discriminant function is changed within a predetermined first range. For example, the setting part 41 sets a third provisional discriminant function in which the coefficient of the provisional optimum discriminant function is changed within a predetermined first range.

Here, examples (A) to (E) of the first range in which the score is changed are described.

(A) When a coefficient has n significant figures, the search is performed in a range in which the number having only the upper first digit of n significant figures of the coefficient (e.g., 0.312 gives 0.3) is varied around the number (e.g., 0.3 gives 0.2, 0.3, and 0.4). It is assumed that a provisional optimum discriminant function F(x) is given by a following Equation (2), for example.

$$F(x)=0.312x1+0.421x2+0.531x3 \qquad (2)$$

In this case, for example, as described below, the searching is performed in the range in which before and after the numerical value whose digit is the largest are changed.

The searching range of the x1 coefficient: 0.2, 0.3, 0.4. The searching range of the x2 coefficient: 0.3, 0.4, 0.5. The searching range of x3 coefficient: 0.4, 0.5, 0.6.

(B) A provisional optimum discriminant function changed according to the combination of the coefficients in the above (A) is used to calculate a provisional authentication accuracy and a provisional optimum discriminant function is created by adopting a pair of the coefficients whose provisional authentication accuracy is the lowest. For example, when the range of the coefficient is the above (A), each of provisional authentication accuracies is calculated by changing all the combinations of coefficients in 27 ways (=3×3×3). As a result, the coefficient in the combination whose provisional authentication accuracy is the lowest is set as a provisional discriminant function. For example, when the combination of following (3) has the lowest provisional authentication accuracy, the provisional optimum discriminant function F1($x$) is expressed by Equation (4).

$$(\text{Coefficient of }x1, \text{Coefficient of }x2, \text{Coefficient of }x3)= (0.3, 0.4, 0.5) \qquad (3)$$

$$F1(x)=0.3x1+0.4x2+0.5x3 \qquad (4)$$

(C) The search is performed in the range of coefficients each of which turns to one of the coefficients in (B) by rounding the number of the second upper digit (e.g., 0.25 gives 0.3 in (B)). For example, the searching is performed in the ranges described below.

The searching range of the x1 coefficient: 0.25, 0.26, 0.27, 0.28, 0.29, 0.3, 0.31, 0.32, 0.33, 0.34. The searching range of the x2 coefficient: 0.35, 0.36, 0.37, 0.38, 0.39, 0.4, 0.41, 0.42, 0.43, 0.44. The searching range of the x3 coefficient: 0.45, 0.46, 0.47, 0.48, 0.49, 0.5, 0.51, 0.52, 0.53, 0.54.

(D) As similar to (B), when it is changed by the combinations (in $10^3$ ways) of the coefficients described in (C), a combination of the coefficients whose provisional authentication accuracy is the lowest is adopted.

(E) Gradually reducing the digit, (3) the range search and (4) coefficient adoption are performed to determine the combination of coefficients by the number of n significant figures. The discriminant function using this combination of the coefficients is adopted as an optimum discrimination function.

Also, the setting part 41 may create multiple third provisional discriminant functions by using the result of the above-described cross-validation. For example, in the cross-validation, learning is performed for multiple times. The setting part 41 may use the range between the maximum value and the minimum value of the coefficients of the multiple provisional discriminant functions as the first range for the searching. In addition, the setting part 41 may use the range in each of multiple stages including the coefficient for the searching by dividing the range of the maximum value and the minimum value into the multiple stages (for example, 10 stages). Also, the setting part 41 may use the range of the maximum value and the minimum value of the coefficient of the multiple second provisional discriminant functions as a predetermined first range. Moreover, the setting part 41 may use the range in each of multiple stages including the coefficient for the searching by dividing the range of the maximum value and the minimum value of the multiple second provisional discriminant functions into the multiple stages.

When the variation of the scores becomes large or the searching is performed on all the coefficients of the functions without limiting a range around the provisional optimum discriminant function, it takes a lot of time to determine an optimum discriminant function because the searching range becomes wider as the number of the feature quantities becomes larger. Since the searching range becomes wider, a probability of losing the optimum discriminant function becomes higher. Thus, optimum setting for the biometric identification device 11 becomes difficult. For this reason, as described in the embodiment, the setting part 41 does not cause the variation of the scores to be larger and limits the range around the provisional optimum discriminant function, so that time taken for determining an optimum discriminant function may be made minimum and the probability of losing the optimum discriminant function may be reduced. Furthermore, the provisional discriminant function is a learning result by the machine learning, and when the machine learning with high discrimination or identification accuracy is used, the other authentication accuracy is also likely increased even when any authentication accuracy is used as a standard. For this reason, only the periphery of the provisional optimum discriminant function is searched, so that a time and effort to validate the case where the authentication accuracy is excessively poor may be omitted. As a result, efficient searching becomes possible.

The calculation part 42 acculturates multiple third provisional authentication accuracies of the third provisional discriminant functions by applying the third provisional discriminant functions to the second adjustment dataset. For example, the calculation part 42 calculates the FAR and FRR as third provisional authentication accuracies of each of the third provisional discriminant functions.

As similar to the method of determining a provisional optimum discriminant function, the determination part 44 selects a third provisional discriminant function of which the FAR meets a predetermined standard and the FRR becomes minimum or minimal among the multiple third provisional authentication accuracies, and determines the selected third provisional discriminant function as an optimum discriminant function. When multiple third provisional discriminant functions are selected of which the FAR meets the predetermined standard and the FRR becomes minimum or minimal, the determination part 44 determines a function having an average value of the coefficients of the third provisional discriminant functions or an intermediate value of the coefficients thereof as an optimum discriminant function.

It is to be noted that when the provisional optimum discriminant function meets the desired authentication accuracy, the processing may be terminated without calculating the optimum discriminant function and use the provisional optimum discriminant function as an optimum discriminant function.

Here, in the biometric authentication, it is often difficult to collect a large amount of the adjustment dataset 30 for learning and there is sometimes a case where a learning result achieving sufficient authentication accuracy, in other words, the provisional optimal discriminant function is not obtained. For example, to collect adjustment data, a large number of collaborators and a longer time are taken. Furthermore, the collection cost also becomes huge. For this reason, there is a case where sufficient number of data pieces desired for obtaining accuracy is incapable of being obtained depending on the accuracy desired by the biometric identification device 11. Even when the number of the adjustment datasets 30 is not sufficient and the authentication accuracy of the provisional optimum discriminant function is not sufficient, the discriminant function specifying device 10 may determines an optimum discriminant function which has better authentication accuracy and is optimum for the biometric identification device 11 by searching the periphery of the provisional optimum discriminant function.

Also, since the number of data pieces is small, the number of candidates for an optimum discriminant function sometimes increases. In this case, a function having each of coefficients which is an average of the corresponding coefficients of the candidates for the optimum discriminant function or an intermediate value of the corresponding coefficients thereof is adopted as an optimum discriminant function, so that a stable optimum discriminant function may be determined so that the authentication accuracy is not largely changed even when the coefficient varies.

Also, the technique to perform authentication according to the multiple feature quantities without using a discriminant function includes a density based method, for example. However, in the density based method, the biometric identification device 11 saves, at least each of the feature quantities, auxiliary data including the distribution of a relationship between the probability that a person is determined and the probability that another person is determined when some score is given. The size of the saved auxiliary data depends on the authentication accuracy of the authentication algorithm of the feature quantities. For example, when the authentication accuracy of the authentication algorithm of each of the feature quantities is low, the authentication accuracy is sometimes increased by adding the feature quantity. In this case, the size is increased by the amount of the auxiliary data relating to the added feature quantity. For this reason, when the data capacity is limited which may be saved in the biometric identification device 11, it may cause such a case that implementation sometimes becomes difficult.

On the other hand, in the biometric authentication method according to the embodiment uses a discriminant function which is achievable only by saving a fixed number of coefficients as in above Equation (1), so that a size of auxiliary data saved in the biometric identification device 11 may be suppressed to be equal to or smaller than a fixed size without being affected by the authentication accuracy for an authentication engine or data used for learning.

In this manner, the discriminant function specifying device 10 according to the embodiment may determine an optimum learning input parameter and an optimum discriminant function based on authentication accuracy without changing size of saved auxiliary data. Accordingly, a discriminant function according to a usage or usage environment of the biometric identification device 11 may be determined.

[Processing Flow]

Figure 4:
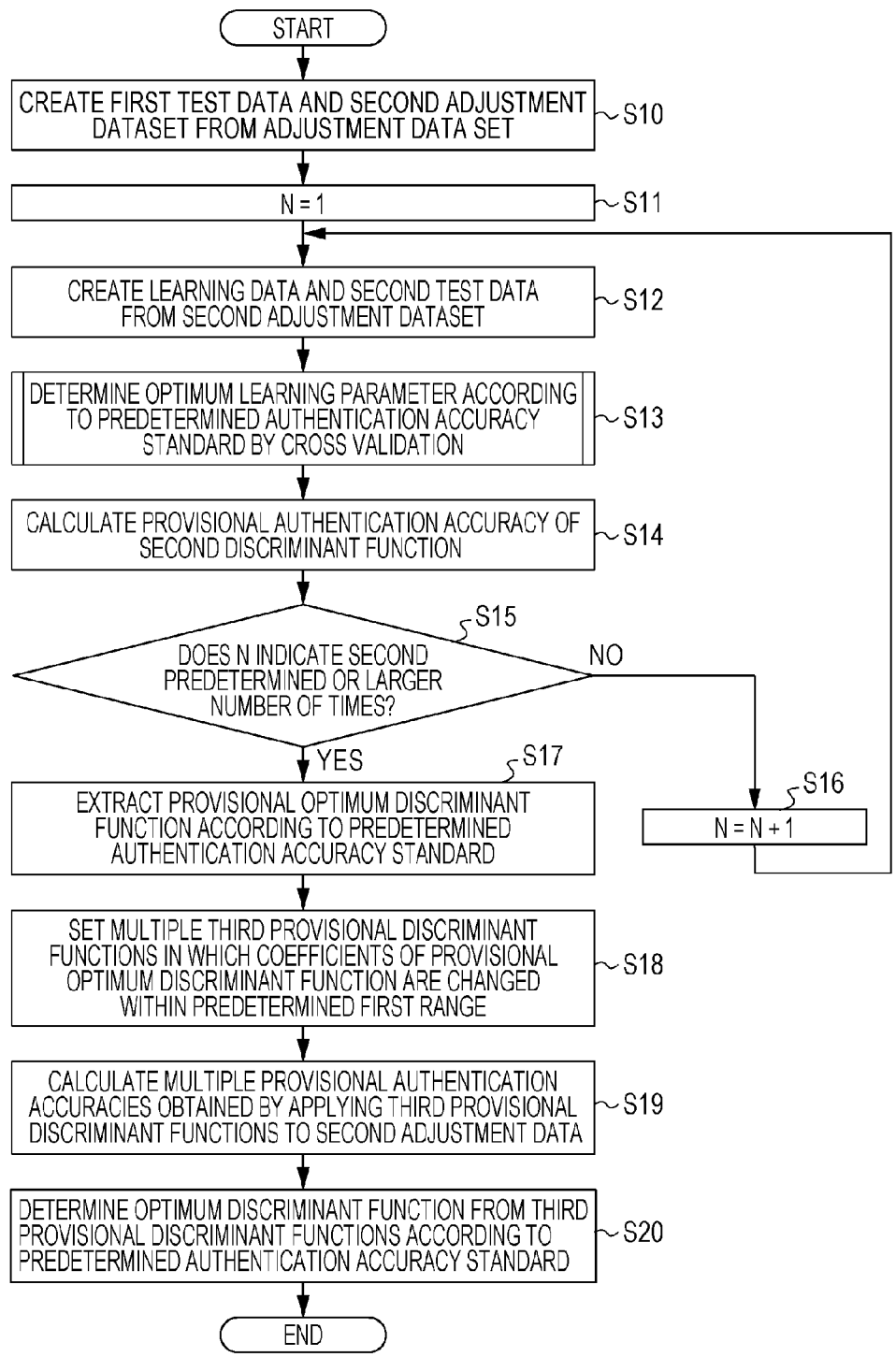
FIG. 4 is a flowchart illustrating an example procedure of discriminant function specifying processing.

First, the description is given of a flow of discriminant function specifying processing in which the discriminant function specifying device 10 according to the embodiment specifies an optimum discriminant function. FIG. 4 is a flowchart illustrating an example procedure of discriminant function specifying processing. This detection processing is executed at predetermined timing, for example, timing when an operation instructing to specify a discriminant function is accepted.

As illustrated in FIG. 4, the selection part 40 performs selection from the adjustment dataset 30 based on a predetermined selection rule and creates a second adjustment dataset and a first dataset (S10). Also, the selection part 40 sets 1 to a variable N (S11). Then, the selection part 40 performs selection from the second adjustment dataset based on a predetermined selection rule and creates learning data and second test data (S12).

The setting part 41 performs learning by the machine learning using multiple candidates for learning input parameter and learning data and starts cross-validation processing which determines a degree as a learning input parameter (S13).

Figure 5:
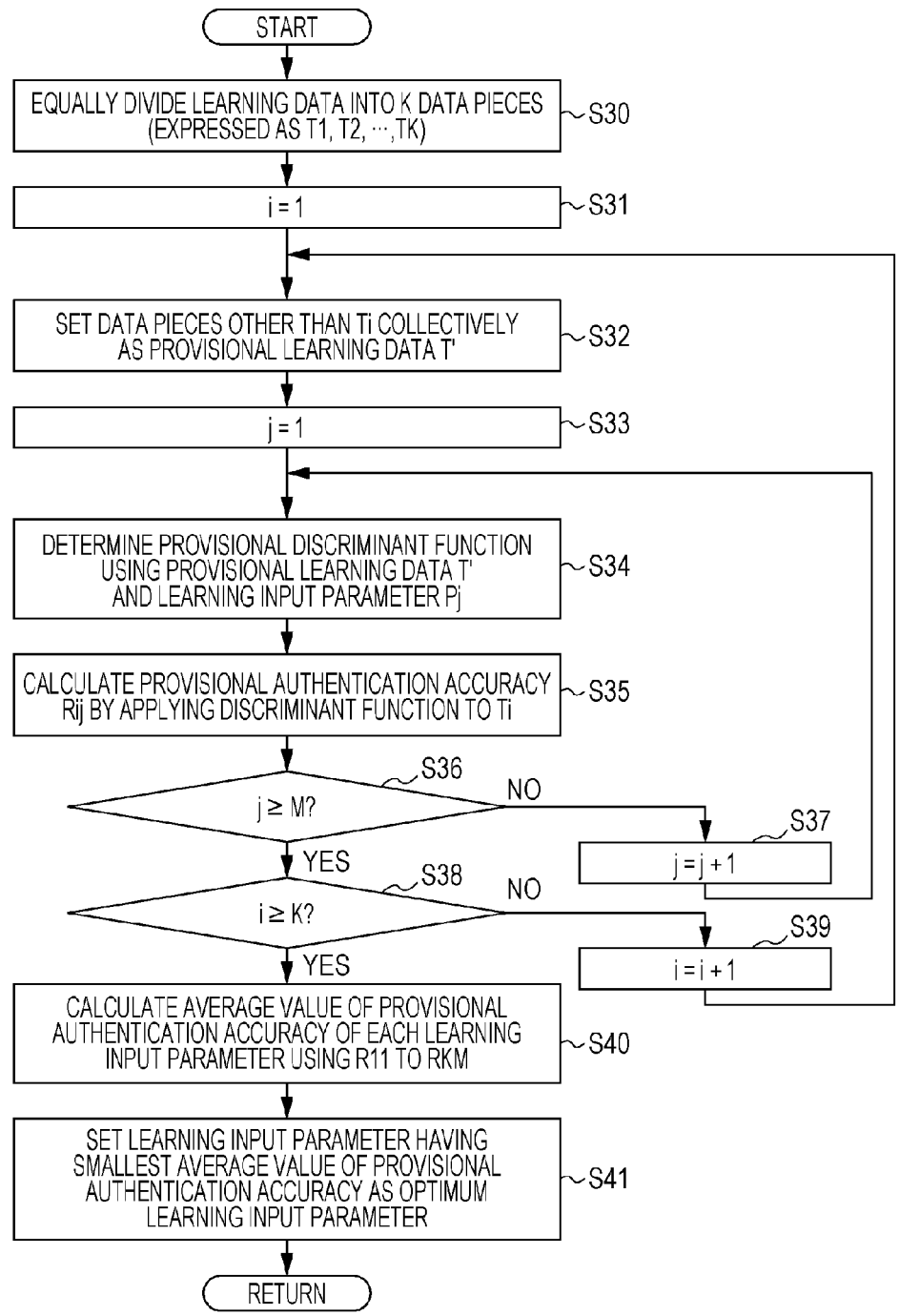
FIG. 5 is a flowchart illustrating an example procedure of cross-validation processing.

Here, the cross-validation processing is described. FIG. 5 is a flowchart illustrating an example procedure of cross-validation processing. This cross-validation processing is executed from S13 of the discriminant function specifying processing.

As illustrated in FIG. 5, the setting part 41 divides the learning data (S30). For example, the setting part 41 divides equally the learning data into k of T1 to Tk. The setting part 41 sets 1 to a variable i (S31). The setting part 41 sets data pieces other than learning data Ti as provisional learning data T' (S32). The setting part 41 sets 1 to a variable j (S33). The setting part 41 determines a provisional discriminant function by using the machine learning using the provisional learning data T' and the learning input parameter Pj (S34). The setting part 41 calculates a provisional authentication accuracy Rij of a learning input parameter Pj by applying the provisional discriminant function to the learning data Ti (S35). The setting part 41 determines whether a value of the variable j becomes equal to or larger than M (S36). When the value of the variable j is not equal to or larger than M (No at S36), the setting part 41 adds 1 to the value of the variable j (S37) and the process proceeds to the above S34.

On the other hand, when the value of the variable j is equal to or larger than M (Yes at S36), the setting part 41 determines whether the value of the variable i becomes equal to or larger than K (S38). When the value of the variable i is not equal to or larger than K (No at S38), the setting part 41 adds 1 to the value of the variable i (S39) and the process proceeds to S32.

On the other hand, when the value of the variable i is equal to or larger than K (Yes at S38), the setting part 41 calculates an average value of the provisional authentication accuracies for each of the learning input parameters (S40). The setting part 41 sets the learning input parameter whose average value of the provisional authentication accuracies is the lowest as an optimum learning input parameter (S41) and terminates the cross-validation processing. Then, the process proceeds to S14 of the discriminant function specifying processing.

Returning to FIG. 4, the calculation part 42 calculates a second provisional authentication accuracy for each of the second provisional discriminant functions by using corresponding each of the second adjustment datasets with respect to the second provisional discriminant functions (S14). The setting part 41 determines whether the value of the variable N becomes a second predetermined number of times (S15). When the value of the variable N is not the second predetermined number of times (No at S15), the setting part 41 adds 1 to the value of the variable N (S16), and the process proceeds to the above described S12.

On the other hand, when the value of the variable N is the second predetermined number of times (Yes at S15), the extraction part 43 extracts a second provisional discriminant function of which an FAR meets a predetermined standard and an FRR becomes minimum or minimal among the second predetermined number of the second provisional authentication accuracies and uses the extracted second provisional discriminant function as a provisional optimum discriminant function (S17). The setting part 41 sets multiple third provisional discriminant functions, each of which is obtained by changing the coefficient of the provisional optimum discriminant function within the predetermined first range (S18). The calculation part 42 applies each third provisional discriminant function to the second adjustment dataset to calculate a third provisional authentication accuracy of each of the third provisional discriminant functions (S19). The determination part 44 selects a third provisional discriminant function of which an FAR meets a predetermined standard and an FRR becomes minimum or minimal among the multiple third provisional authentication accuracies and determines the selected third provisional discriminant function as an optimum discriminant function (S20), and the processing is terminated.

As described above, the discriminant function specifying device 10 according to the embodiment sets multiple discriminant functions each of which separates the distribution of genuine similarity from the distribution of impostor similarity by changing the coefficient of the discriminant function or value of the learning input parameter. For example, the discriminant function specifying device 10 calculates a discriminant function which separates the distribution of genuine similarity from the distribution of impostor similarity by machine learning using the learning input parameter set before the learning and sets multiple discriminant functions by changing the values of the learning input parameter and a learning output parameter which is a parameter for the discriminant function calculated by the learning. The discriminant function specifying device 10 calculates an error rate for each of the set discriminant functions. The discriminant function specifying device 10 extracts a discriminant function of which the calculated error rate meets a predetermined error rate. The discriminant function specifying device 10 may obtain a discriminant function according to a predetermined error condition. In other words, the discriminant function specifying device 10 may obtain the discriminant function according to an intended usage of biometric authentication.

Also, the discriminant function specifying device 10 according to the embodiment sets multiple discriminant functions by changing the value of the learning output parameter within a predetermined range. For example, the discriminant function specifying device 10 sets discriminant functions by changing the value of a coefficient of the discriminant function within a predetermined range. Accordingly, the discriminant function specifying device 10 may determine an optimum discriminant function with authentication accuracy even when sufficient number of data for accuracy is unable to be collected.

Also, the discriminant function specifying device 10 according to the embodiment uses an error rate as an false acceptance rate and a false rejection rate and uses an error condition such that any one of the false acceptance rate and the false rejection rate meets a predetermined condition and the other is minimum or minimal. Accordingly, the discriminant function specifying device 10 may perform biometric authentication with authentication accuracy according to the intended usage of the biometric authentication.

Also, the discriminant function specifying device 10 according to the embodiment selects the learning data which is used for learning based on a predetermined selection rule among the adjustment dataset 30 including scores of multiple feature quantities extracted from one piece of biometric information. The discriminant function specifying device 10 performs machine learning using multiple candidates for the learning input parameter and the learning data and sets multiple provisional discriminant functions. Then, the discriminant function specifying device 10 determines a provisional discriminant function among the multiple provisional discriminant functions where the provisional discriminant function meets a predetermined error condition and accuracy is the highest, and sets, as an optimum learning input parameter, the learning input parameter corresponding to the determined provisional discriminant function. The discriminant function specifying device 10 may obtain a discriminant function according to the predetermined error condition by performing the learning by using the optimum learning input parameter.

Also, the discriminant function specifying device 10 according to the embodiment selects learning data for multiple times based on the predetermined selection rule among the adjustment dataset 30. The discriminant function specifying device 10 sets multiple provisional discriminant functions by performing the machine learning among the selected multiple pieces of learning data. The discriminant function specifying device 10 determines a discriminant function as a discriminant function among the provisional discriminant functions created based on each piece of the learning data, where an error caused by the determined discriminant function meets the predetermined error condition and accuracy is the highest among the provisional discriminant functions. The discriminant function specifying device 10 may obtain a discriminant function according to the predetermined error condition by determining a discriminant function among the multiple provisional discriminant functions of each piece of the learning data.

Second Embodiment

Hereinafter, a second embodiment is described. Described in the second embodiment is a case where a discriminant function is specified by a biometric identification device 11.

[Configuration of Biometric Identification Device]

Figure 6:
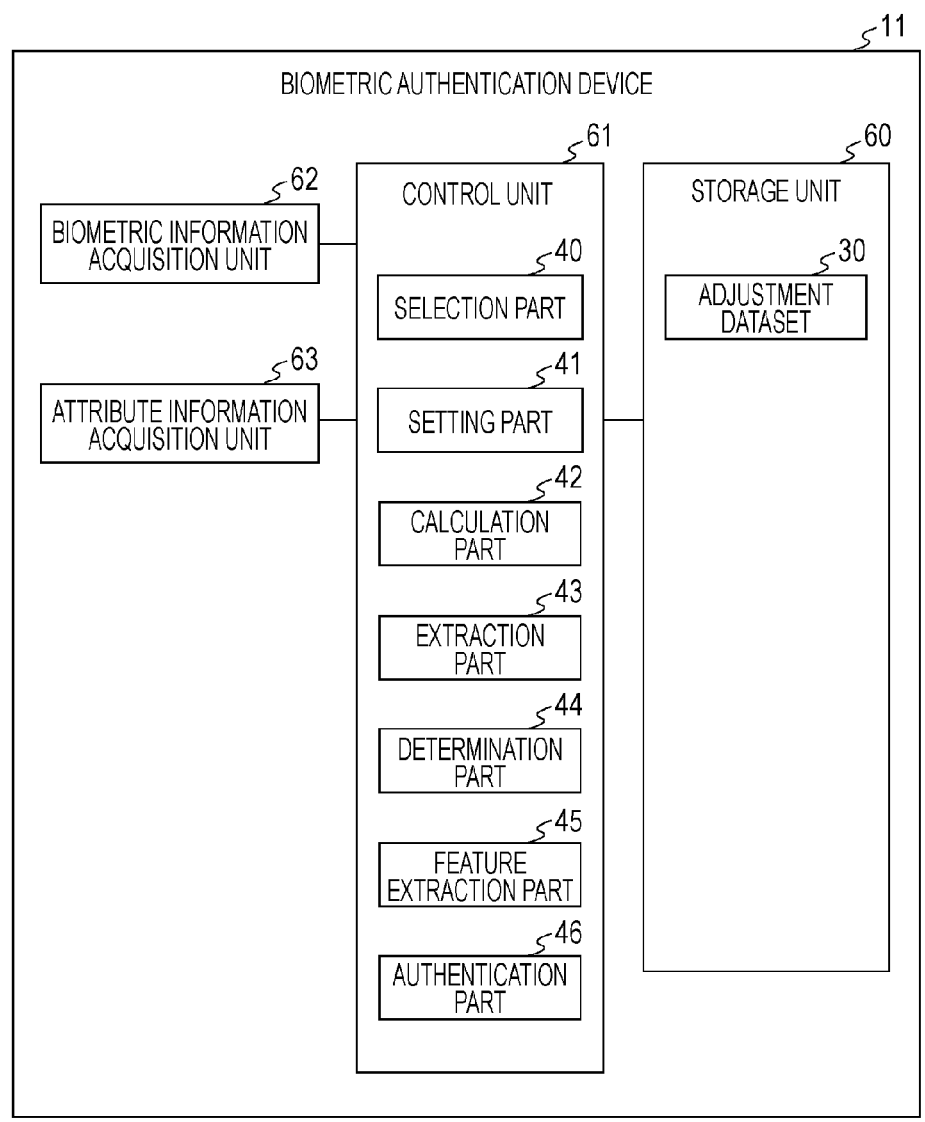
FIG. 6 is a block diagram illustrating a functional configuration of a biometric identification device.

A biometric identification device 11 according a second embodiment is described. FIG. 6 is a block diagram illustrating a functional configuration of a biometric identification device. It is to be noted that same reference numerals are given to denote portions same as those of the discriminant function specifying device 10 illustrated in FIG. 1 and the description is mainly given to different portions. As illustrated in FIG. 6, the biometric identification device 11 includes a storage unit 60, a control unit 61, a biometric information acquisition unit 62, and an attribution information acquisition unit 63.

The storage unit 60 is a storage device including a semiconductor memory element such as a flash memory, a hard disk, and an optical disk. It is to be noted that the storage unit 60 may be a data rewritable semiconductor memory such as a RAM or a flash memory.

The storage unit 60 stores an OS and a various kinds of programs which are executed in the control unit 61. Furthermore, the storage unit 60 stores various pieces of data used in a program which is executed in the control unit 61. For example, the storage unit 60 stores the above-described adjustment dataset 30.

The control unit 61 is a device to control the discriminant function specifying device 10. The control unit 61 may use an electronic circuit such as a CPU or MPU or an integrated circuit such as an ASIC or FPGA. The control unit 61 includes an internal memory to store programs and control data which define various kinds of processing procedures and executes various kinds of processing by using them. The control unit 61 includes a various kinds of programs operated therein and functions as various kinds of processing units. For example, the control unit 61 includes the above-described selection part 40, setting part 41, calculation part 42, extraction part 43 and determination part 44. In addition, the control unit 61 further includes a feature extraction part 45 and an authentication part 46.

The biometric information acquisition unit 62 acquires biometric information from a user of the biometric identification device 11. For example, the biometric information acquisition unit 62 is an electrostatic capacity fingerprint sensor to acquire an image of fingerprint. The biometric information acquisition unit 62 may be a vein sensor including an infrared camera to acquire palm veins. Also, the biometric information acquisition unit 62 may be an assembly of multiple devices such as a fingerprint sensor and a vein sensor.

The attribution information acquisition unit 63 acquires attribution information such as an ID or name of the user. For example, the attribution information acquisition unit 63 is a keyboard or a touch panel for character input. In the case of the biometric identification device 11 which does not use attribution information for authentication, the attribution information acquisition unit 63 may not acquire attribution information.

The feature extraction part 45 extracts multiple feature quantities which are used for authentication from the biometric information. The storage unit 60 stores the feature quantity and the attribution information as registered data for each of the users.

It is to be noted that it is assumed in the embodiment that biometric information is acquired from one user for multiple times and multiple feature quantities are extracted and stored in the storage unit.

Just after the operation is started, the biometric identification device 11 according to the second embodiment utilizes an optimum discriminant function calculated by using the adjustment dataset 30 collected in advance. The storage unit 60 stores the optimum discriminant function determined in advance.

When the authentication is performed just after the operation starts, the authentication part 46 matches the feature quantity of the registered data with the feature quantity extracted from the biometric information inputted by a user at the time of authentication by using the optimum discriminant function determined in advance and calculates a final score. The final score indicates that as the numerical value is higher, a possibility that a user of the registered data and a user attempting the authentication are the identical person is higher. When the final score is equal to or larger than a predetermined threshold, the authentication part 46 determines that the user attempting the authentication is the user of the registered data and determines that the authentication is successful. Also, when the final score is less than a predetermined threshold, the authentication part 46 determines that the user attempting the authentication is not the user of the registered data and determines that the authentication is unsuccessful.

When the number of users registered in the registered data stored in the storage unit 60 is equal to or larger than a predetermined number of persons, the authentication part 46 matches the feature quantities of the registered data of the same user and creates a list of genuine matching score of each feature quantity. Also, the authentication part 46 creates an impostor matching score of each feature quantity by matching the feature quantities of the registered data of different users. The authentication part 46 stores the adjustment data for operation in which both of the created genuine matching score and the impostor matching score are created in the storage unit 60.

The selection part 40, setting part 41, calculation part 42, extraction part 43, and determination part 44 calculate a new optimum discriminant function by a method similar to that of the first embodiment by using the adjustment data for operation in which both of the genuine matching score and the impostor matching score are included. Here, the new optimum discriminant function may be created only from the adjustment data for operation or may calculate a new optimum discriminant function by using the adjustment dataset 30 and the adjustment data for operation.

The storage unit 60 replaces the optimum discriminant function calculated in advance with the new optimum discriminant function and stores the new optimum discriminant function.

In the case of the authentication after the new optimum discriminant function is calculated, the authentication part 46 determines whether the authentication is successful or unsuccessful by performing the matching using the new optimum identification function.

As described above, the biometric identification device 11 according to the embodiment changes a new optimum discriminant function used for matching according an actual user, so that matching more adjusted to user data tendency may be performed. Accordingly, authentication accuracy is relatively improved as compared with the case in which the optimum discriminant function is used. Also, the biometric identification device 11 may reset the new optimum discriminant function in operation even when the desired authentication accuracy of the biometric authentication is changed from one assumed at the time when it is developed, so that matching may be performed more optimally for usage environment.

Third Embodiment

The embodiments of the disclosed devices are described. However, the disclosed technology may be implemented in various different modes in embodiments other than the above-described embodiments. For this reason, other embodiments are described below.

For example, in the above embodiments, the description is given of the case where a biometric authentication is performed by using a discriminant function in the biometric identification device 11. However, the disclosed device is not limited to this. The biometric authentication may be performed in a sever by using a discriminant function by transmitting to the server the biometric information acquired by the biometric identification device 11 or feature quantities calculated from the biometric information. In other words, authentication may be performed by a system including a terminal and a server.

Also, in the above-described embodiments, only a degree of a discriminant function is set as a learning input parameter. However, another learning input parameter may be set. For example, a margin parameter may be set. When multiple learning input parameters are set, they may be set all together. Alternatively, a learning parameter is set one by one from the multiple learning input parameters and remaining learning input parameters may be set by use of the previously set learning input parameter.

In addition, the components of the devices illustrated in the drawings are functional and conceptual, and they may not be physically configured as illustrated. In other words, specific states of distribution and integration of devices are not limited to ones illustrated, and all or a part thereof may be configured by physically and functionally distributing or integrating them in an arbitrary unit according to various kinds of loads or usage conditions. For example, processing units of a selection part 40, setting part 41, calculation part 42, extraction part 43, determination part 44, feature extraction part 45, and authentication part 46 in each of a discriminant function specifying device 10 and a biometric identification device 11 may be integrated as appropriate. Also, processing of each processing unit may be divided into processing of multiple processing units as appropriate. For example, the setting part 41 may divided into multiple processing parts of a first processing part, a second processing part, and so on according to the processing which is set by each of the processing parts. Also, one part or all of the processing parts of each device may be integrated as appropriate. Furthermore, as for each processing function which is performed by each processing unit, all or one part thereof may be achieved by a CPU and a program which is analyzed and executed in the CPU or may be achieved as hardware by a wired logic.

[Discriminant Function Specifying Program]

Figure 7:
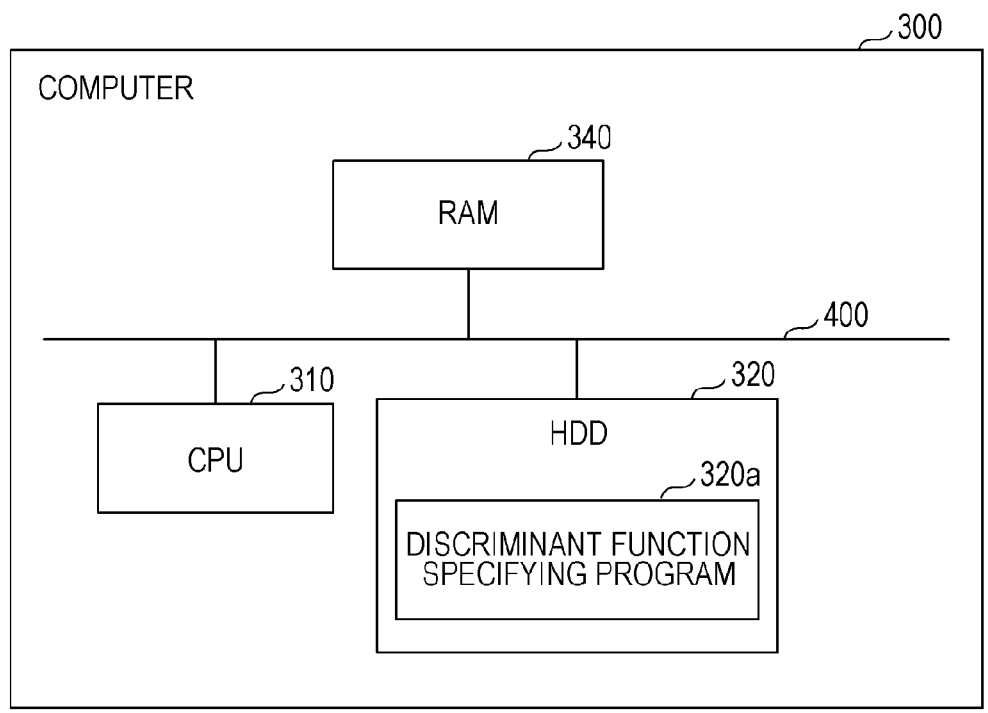
FIG. 7 is a diagram illustrating a computer executing a discriminant function specifying program.

Also, the various kinds of processing described above may be achieved by executing a program prepared in advance in a computer system such as a personal computer or a workstation. Accordingly, described below is an example computer system executing a program having functions similar to those in the above embodiments. FIG. 7 is a diagram illustrating a computer executing a discriminant function specifying program.

As illustrated in FIG. 7, a computer 300 includes a central processing unit (CPU) 310, a hard disk drive (HDD) 320, a random access memory (RAM) 340. These units 300 to 340 are coupled with each other through a bus 400.

A discriminant function specifying program 320a which includes a function similar to those of the processing units of the discriminant function specifying device 10 and the biometric identification device 11 is stored in advance in the HDD 320. It is to be noted that the discriminant function specifying program 320a may be divided as appropriate.

Also, the HDD 320 stores various pieces of information. For example, the HDD 320 stores various pieces of data which are used for OS or processing.

Then, the CPU 310 executes the discriminant function specifying program 320a by reading the program 320a from the HDD 320, so that an operation similar to that performed by each processing unit of the embodiment is executed. In other words, the discriminant function specifying program 320a executes an operation similar to those performed by the processing parts of the discriminant function specifying device 10 and the biometric identification device 11.

It is to be noted that the discriminant function specifying program 320a may not be stored in the HDD 320 from the beginning.

For example, programs are stored in "transportable physical medium" such as a flexible disk (FD), CD-ROM, DVD disk, magneto-optical disk, or IC card, which is inserted to the computer 300. Then, the computer 300 may read and execute the program therefrom.

Furthermore, programs are stored in "another computer (or server)" which is coupled with the computer 300 through a public line, the Internet, LAN, or WAN. Then, the computer 300 may read and execute the program therefrom.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system, comprising:
    a discriminant identification device that includes a processor configured to:
        specify a discriminant function by machine learning using learning data and a learning input parameter, the discriminant function being for separating a distribution of a genuine similarity from a distribution of impostor similarity, the learning input parameter indicating a degree of the discriminant function and being set before executing the machine learning,
        set a plurality of discriminant functions, each of the plurality of discriminant functions being obtained by changing values of the learning input parameter and a learning output parameter, the learning output parameter being a parameter indicating a coefficient of the calculated discriminant function,
        acquire an error rate for each of the plurality of discriminant functions; and
        extract one discriminant function among the plurality of discriminant functions, the one discriminant function having the error rate which meets a predetermined error condition; and
    a biometric identification device coupled to the discriminant identification device and configured to perform biometric authentication using the extracted discriminant function.

2. The system according to claim 1, wherein the processor is configured to set the plurality of discriminant functions by changing a value of the learning output parameter within a predetermined range.

3. The system according to claim 1, wherein
    the error rate includes a false acceptance rate and a false rejection rate, and
    the predetermined error condition is such that any one of the false acceptance rate and the false rejection rate meets a predetermined condition and the other is minimum or minimal.

4. The system according to claim 1, wherein the processor is further configured to
    select learning data used for the machine learning from an adjustment dataset including a plurality of scores of feature quantities extracted from one or more pieces of biometric information, based on a predetermined selection rule, wherein
    determine a first plurality of provisional discriminant functions by performing the machine learning using a plurality of candidates for the learning input parameter and the learning data, and
    adopt, as the learning input parameter, a candidate for the learning input parameter among the plurality of candidates for the learning input parameter, the candidate for the learning input parameter being associated with a provisional discriminant function among the plurality of provisional discriminant functions, the error rate of the provisional discriminant function meeting the predetermined error condition and accuracy of the discriminant function being the highest.

5. The system according to claim 4, wherein the processor is configured to:
    select the learning data from the adjustment dataset for a plurality of times to select a plurality of pieces of learning data based on the predetermined selection rule,
    set each of a second plurality of provisional discriminant functions by performing machine learning on corresponding each of the selected plurality of pieces of learning data, and
    determine, as the discriminant function, a provisional discriminant function of which the error rate meets the predetermined error condition and accuracy is the highest among the second plurality of provisional discriminant functions.

6. The system according to claim 4, wherein the predetermined selection rule is a method including:
    setting a numerical value as a seed value;
    specifying a random value by a random number generation function based on the seed value; and
    randomly selecting the learning data from the adjustment dataset based on the specified random value.

7. The system according to claim 4, wherein the predetermined selection rule is a method including regularly selecting the learning data from the adjustment dataset every fixed number.

8. The system according to claim 1, wherein the error rate is a false acceptance rate and a false rejection rate.

9. A discriminant function specifying method executed by a system including a discriminant identification device and a biometric identification device coupled to the discriminant identification device, the discriminant function specifying method comprising:
    specifying, by the discriminant identification device, a discriminant function by machine learning using learning data and a learning input parameter, the discriminant function being for separating a distribution of a genuine similarity from a distribution of impostor similarity, the learning input parameter indicating a degree of the discriminant function and being set before executing the machine learning;

setting a plurality of discriminant functions, each of the plurality of discriminant functions being obtained by changing values of the learning input parameter and a learning output parameter, the learning output parameter being a parameter indicating a coefficient of the calculated discriminant function;

acquiring an error rate for each of the plurality of discriminant functions;

extracting one discriminant function among the plurality of discriminant functions, the one discriminant function having the calculated error rate which meets a predetermined error condition;

performing, by the discriminant identification device, biometric authentication using the extracted discriminant function.

10. A discriminant identification device, comprising:

a memory; and a processor coupled to the memory and configured to:

specify a discriminant function by machine learning using learning data and a learning input parameter, the discriminant function being for separating a distribution of a genuine similarity from a distribution of impostor similarity, the learning input parameter indicating a degree of the discriminant function and being set before executing the machine learning, and set a plurality of discriminant functions, each of the plurality of discriminant functions being obtained by changing values of the learning input parameter and a learning output parameter, the learning output parameter being a parameter indicating a coefficient of the calculated discriminant function, acquire an error rate for each of the plurality of discriminant functions, extract one discriminant function among the plurality of discriminant functions, the one discriminant function having the error rate which meets a predetermined error condition, and perform biometric authentication using the extracted discriminant function.

* * * * *